United States Patent
Mohseni et al.

(10) Patent No.: US 6,999,500 B2
(45) Date of Patent: Feb. 14, 2006

(54) SYSTEM FOR DIRECT SEQUENCE SPREADING

(75) Inventors: Mohammad J. Mohseni, San Diego, CA (US); Brian K. Butler, La Jolla, CA (US); Deepu John, San Diego, CA (US); Haitao Zhang, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 831 days.

(21) Appl. No.: 10/005,453

(22) Filed: Nov. 2, 2001

(65) Prior Publication Data

US 2002/0118728 A1  Aug. 29, 2002

Related U.S. Application Data

(60) Provisional application No. 60/245,232, filed on Nov. 3, 2000.

(51) Int. Cl.
*H04B 1/69* (2006.01)
*H04B 1/707* (2006.01)
*H04B 1/713* (2006.01)

(52) U.S. Cl. .................. 375/146; 375/130; 375/140; 375/367; 327/164

(58) Field of Classification Search ............... 375/146, 375/145, 130, 140, 367; 370/342; 327/164
See application file for complete search history.

(56) References Cited

U.S. PATENT DOCUMENTS

| 5,712,869 | A | | 1/1998 | Lee et al. | |
| 5,940,434 | A | * | 8/1999 | Lee et al. | 375/146 |
| 6,052,404 | A | * | 4/2000 | Tiepermann | 375/145 |
| 6,377,539 | B1 | * | 4/2002 | Kang et al. | 370/209 |

* cited by examiner

*Primary Examiner*—Stephen Chin
*Assistant Examiner*—Erin M. File
(74) *Attorney, Agent, or Firm*—Philip R. Wadsworth; Charles D. Brown; Kenyon S. Jenckes

(57) ABSTRACT

A spreading system according to an embodiment of the invention spreads two data signals. The system produces a filtered signal that is based on one of the data signals and an output signal that is based on both of the data signals. In one example, a spreading system is used to perform QPSK spreading of two data signals, including separate processing of the two data signals, in a practical manner. Such separate control may include filtering and/or gain control.

11 Claims, 17 Drawing Sheets

SYSTEM FOR DIRECT SEQUENCE SPREADING

RELATED APPLICATIONS

This application claims benefit of U.S. Provisional Patent Application No. 60/245,232, filed Nov. 3, 2000 and entitled "CIRCUIT FOR DIGITAL DATA TRANSMISSION".

FIELD OF THE INVENTION

This invention relates to digital data transmission.

BACKGROUND INFORMATION

Spread spectrum communication techniques are robust to noise, allow for the use of low transmission power, and have a low probability of intercept. For such reasons, much of the early development of spread spectrum technology was performed by military researchers. Recently, however, the advantages of this technology have led to its increasing use for consumer applications as well: most notably, in advanced digital cellular telephone systems.

Whereas most other communication techniques modulate a carrier signal with one or more data signals alone, spread spectrum techniques also modulate the carrier with a pseudorandom noise or 'pseudonoise' (PN) signal. In the frequency-hopping variant of spread spectrum systems, the value of the PN signal at a particular instant determines the frequency of the transmitted signal, and thus the spectrum of the signal is spread. In the direct sequence spread spectrum (DSSS) variant, the bit rate of the PN signal (called the 'chip rate') is chosen to be higher than the bit rate of the information signal, such that when the carrier is modulated by both signals, its spectrum is spread.

Communication systems that support multiple individual signals over a single channel must employ some technique to make the various signals distinguishable at the receiver. In time-division multiple-access (TDMA) systems, the individual signals are transmitted in nonoverlapping intervals such that they are orthogonal (and thus separable) in time space. In frequency-division multiple-access (FDMA) systems, the signals are bandlimited and transmitted in nonoverlapping subchannels such that they are orthogonal in frequency space. In code-division multiple-access (CDMA) systems, the signals are spread through modulation by orthogonal or uncorrelated code sequences such that they are orthogonal or nearly orthogonal in code space and may be transmitted across the same channel at the same time while remaining distinguishable from each other at the receiver. An exemplary CDMA system is described in U.S. Pat. No. 4,901,307, entitled "SPREAD SPECTRUM MULTIPLE-ACCESS COMMUNICATION SYSTEM USING SATELLITE OR TERRESTRIAL REPEATERS," issued Feb. 13, 1990 and assigned to the assignee of the present invention.

In a CDMA DSSS system, then, each individual carrier signal is modulated by a data signal and a pseudonoise (PN) signal that is at least nearly orthogonal to the PN signals assigned to all other users, thus spreading the spectrum of the transmitted signal while rendering it distinguishable from the other users' signals. Before spreading and modulation onto the carrier, the data signal typically undergoes various encoding and interleaving operations designed, for example, to increase data redundancy and allow error correction at the receiver. The data signals may also be encrypted to provide extra security against eavesdroppers. The generation of CDMA signals in a spread spectrum communications system is disclosed in U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM," assigned to the assignee of the present invention.

In order to spread the spectrum of the input data signal or signals, direct sequence spread spectrum systems typically use a variant of phase-shift keying (PSK), such as binary PSK (BPSK) or quadrature PSK (QPSK). In BPSK spreading, for example, the mapping of data input to spreading system output may be defined by the following complex relation:

$$\text{out\_I\_}n + j \times (\text{out\_Q\_}n) = (\text{in\_}n \times \text{pn\_I\_}n) + j \times (\text{in\_}n \times \text{pn\_Q\_}n)$$

$$\forall n = 1, 2, \ldots, N,$$

where in_n designates an input data signal; pn_I_n and pn_Q_n designate the corresponding pseudonoise sequences for the I and Q channels, respectively; out_I_n and out_Q_n designate the corresponding output I and Q components; j designates the square root of −1; N designates the number of input data signals to be modulated onto the carrier; and the various input signals, output components, and pseudonoise sequence elements may have values of +1 or −1. FIG. 1 shows a diagram for a BPSK spreader array that implements the relation above using two multipliers 10 and 20 as spreaders, and TABLE 1 shows the output values corresponding to the given range of inputs.

FIG. 2 shows a digital implementation of the circuit of FIG. 1 using two XOR gates 30 and 40 as spreaders (the uppercase-labeled digital signals in this figure correspond to the lowercase-labeled analog signals of the same name in FIG. 1). TABLE 3 shows the possible range of digital inputs and the corresponding digital output values for this spreader array (an exemplary analog-to-digital mapping is given in TABLE 2). As illustrated in FIG. 3, the spectrum of each of the output signals OUT_I_1 and OUT_Q_1 is described by a sinc function (i.e., sin(x)/x) having nodes at multiples of the chip rate.

TABLE 1

| in_n | pn_I_n | pn_Q_n | out_I_n | out_Q_n |
|---|---|---|---|---|
| −1 | −1 | −1 | −1 | −1 |
| −1 | −1 | +1 | −1 | +1 |
| −1 | +1 | −1 | +1 | −1 |
| −1 | +1 | +1 | +1 | +1 |
| +1 | −1 | −1 | −1 | −1 |
| +1 | −1 | +1 | −1 | +1 |
| +1 | +1 | −1 | +1 | −1 |
| +1 | +1 | +1 | +1 | +1 |

TABLE 2

| Analog value | Digital representation |
|---|---|
| −1 | 1 |
| +1 | 0 |

TABLE 3

| IN_n | PN_I_n | PN_Q_n | OUT_I_n | OUT_Q_n |
|---|---|---|---|---|
| 0 | 0 | 0 | 0 | 0 |
| 0 | 0 | 1 | 0 | 1 |

TABLE 3-continued

| IN_n | PN_I_n | PN_Q_n | OUT_I_n | OUT_Q_n |
|------|--------|--------|---------|---------|
| 0 | 1 | 0 | 1 | 0 |
| 0 | 1 | 1 | 1 | 1 |
| 1 | 0 | 0 | 1 | 1 |
| 1 | 0 | 1 | 1 | 0 |
| 1 | 1 | 0 | 0 | 1 |
| 1 | 1 | 1 | 0 | 0 |

FIG. 4 shows a circuit diagram for a BPSK spreading system implementing the spreading scheme above for N=2. (In this example, PN_I_1=PN_I_2=PN_I and PN_Q_1=PN_Q_2=PN_Q.) After being spread by spreader array 100 having XOR gates 110, 120, 130 and 140 as spreaders, each one-bit-wide input signal is transformed into a P-bit-wide signal by one of digital pulse-shaping filters 150, 160, 170, and 180, which limits the output signal's bandwidth to the chip rate. In an exemplary application, P is 11, although P may take on any value that provides a performance/complexity relation appropriate for the intended use. An ideal response for a pulse-shaping filter is shown in FIG. 5, where the x axis represents frequency normalized to the chip rate, and the y axis represents magnitude normalized to a peak value.

The most commonly used type of digital filter is the linear constant coefficient filter, which may be constructed to have a finite impulse response (FIR) or an infinite impulse response (IIR). An example block diagram for a generic three-tap finite-impulse-response (FIR) digital filter which implements the transfer function $$H(z)=g_0+g_1z^{-1}+g_2z^{-2}+g_3z^{-3}$$

is displayed in FIG. 6, where D designates a delay element and G0 through G3 designate gain elements which may be implemented as constant multipliers whose factors are the coefficients $g_o$ through $g_3$.

An example block diagram (in direct form II) for a generic three-tap infinite-impulse-response (IIR) digital filter which implements the transfer function $$H(z) = \frac{\sum_{k=0}^{3} b_k z^{-k}}{1 - \sum_{k=1}^{3} a_k z^{-k}}$$

is displayed in FIG. 7, where D designates a delay element and A1 through A3 and B0 through B3 designate gain elements which may be implemented as constant multipliers whose factors are the coefficients $a_1$ through $a_3$ and $b_0$ through $b_3$, respectively. Respective properties and advantages of FIR and IIR filters, various other filter structures besides those displayed in FIGS. 6 and 7, and different methods of choosing the filter coefficients are discussed in such works as *Electronic Filter Design Handbook*, $2^{nd}$ ed., A. B. Williams and F. J. Taylor, McGraw-Hill, New York, N.Y., 1988; section XVI of *The Circuits and Filters Handbook*, ed. by W.-K. Chen, CRC Press, Boca Raton, Fla., 1995; and *Digital Filtering: an introduction*, E. P. Cunningham, Houghton Mifflin, Boston, Mass., 1992.

In practice, the pulse-shaping filters will typically have a large number of taps in order to provide a sharp cutoff, usually at one-half of the chip rate. By way of example, a pulse-shaping FIR filter after the TR45 Mobile Station—Base Station Compatibility Standard for Dual-Mode Wideband Spread Spectrum Cellular Systems (TIA/EIA/SP-3693 [to be published as TIA/EIA-95], TIA [Telecommunications Industry Association], Arlington, Va., 1997) has 48 taps, whose coefficients $g_0$ through $g_{47}$ are given in TABLE 4. The two-volume TR45 Standard referenced above specifies numerous aspects of an exemplary CDMA DSSS application whose performance may be improved through the use of the present invention.

TABLE 4

| n | $g_n$ |
|---|-------|
| 0, 47 | −0.025288315 |
| 1, 46 | −0.034167931 |
| 2, 45 | −0.035752323 |
| 3, 44 | −0.016733702 |
| 4, 43 | 0.021602514 |
| 5, 42 | 0.064938487 |
| 6, 41 | 0.091002137 |
| 7, 40 | 0.081894974 |
| 8, 39 | 0.037071157 |
| 9, 38 | −0.021998074 |
| 10, 37 | −0.060716277 |
| 11, 36 | −0.051178658 |
| 12, 35 | 0.007874526 |
| 13, 34 | 0.084368728 |
| 14, 33 | 0.126869306 |
| 15, 32 | 0.094528345 |
| 16, 31 | −0.012839661 |
| 17, 30 | −0.143477028 |
| 18, 29 | −0.211829088 |
| 19, 28 | −0.140513128 |
| 20, 27 | 0.094601918 |
| 21, 26 | 0.441387140 |
| 22, 25 | 0.785875640 |
| 23, 24 | 1.0 |

After filtering, the digital signals may be gain-adjusted (not shown) before conversion to analog by a digital-to-analog converter (not shown). Examples of such steps are described in, e.g., U.S. Pat. No. 5,103,459 referenced above. Then the analog signals corresponding to the various OUT_I_n are summed to create the in-phase component of the transmitter output, and the analog signals corresponding to the various OUT_Q_n are summed to create the quadrature output.

Note that in this BPSK implementation, the paths of the various input data signals do not coincide until after the signals have been converted into analog. Specifically, each signal outputted by the spreading system is based on only one data signal. Therefore, one data signal may be processed differently from another either before or after BPSK spreading.

In other PSK modulation schemes, however, each spread signal outputted by the spreading system may be based on more than one data signal. Consequently, when using existing spreading systems for such schemes, any separate processing of the data signals must be performed before spreading. In a case where the separate processing operation increases the complexity of the data signal (for example, by increasing the width of the data signal in bits), the resulting increase in the complexity of the spreading system that may be required may render the desired implementation impracticable. It is desirable to obtain a practical spreading system that enables such processing to be performed.

SUMMARY

A spreading system according to one embodiment of the invention includes a first spreader, a second spreader, a filter, and an adder. The first spreader is configured and arranged to produce a first spread signal based on a first data signal. For example, the first spreader (which may be implemented as an XOR gate) may spread the first data signal with a first pseudonoise sequence. The second spreader is configured and arranged to produce a second spread signal based on a second data signal. For example, the second spreader (which may also be implemented as an XOR gate) may spread the second data signal with a second pseudonoise sequence, which may be different from the first pseudonoise sequence.

The filter is configured and arranged to produce a filtered signal based on the first spread signal. The filter may receive the first spread signal as a one-bit-wide signal and may output the filtered signal as a signal having a width greater than one bit. In one implementation, the filter includes a lowpass filter having a cutoff frequency that is substantially equal to one-half of a bit rate of the first spread signal.

The adder is configured and arranged to produce a digital sum signal based on the filtered signal and the second spread signal. In some implementations, the adder may subtract one of its inputs from the other.

A spreading system according to another embodiment of the invention includes a gain element, which may include a multiplier. In one implementation, the gain element occurs in the signal path between the filter and the adder. In another implementation, the gain element occurs in the signal path between the second spreader and the adder.

A spreading system according to another embodiment of the invention includes a third spreader and a fourth spreader. The third spreader is configured and arranged to produce a third spread signal based on the first data signal. For example, the first spreader (which may be implemented as an XOR gate) may spread the first data signal with the second pseudonoise sequence. The fourth spreader is configured and arranged to produce a fourth spread signal based on the second data signal. For example, the fourth spreader (which may also be implemented as an XOR gate) may spread the second data signal with the first pseudonoise sequence.

Other embodiments and applications of the invention (including methods of digital signal processing) are also described herein.

DETAILED DESCRIPTION

Figure 8:
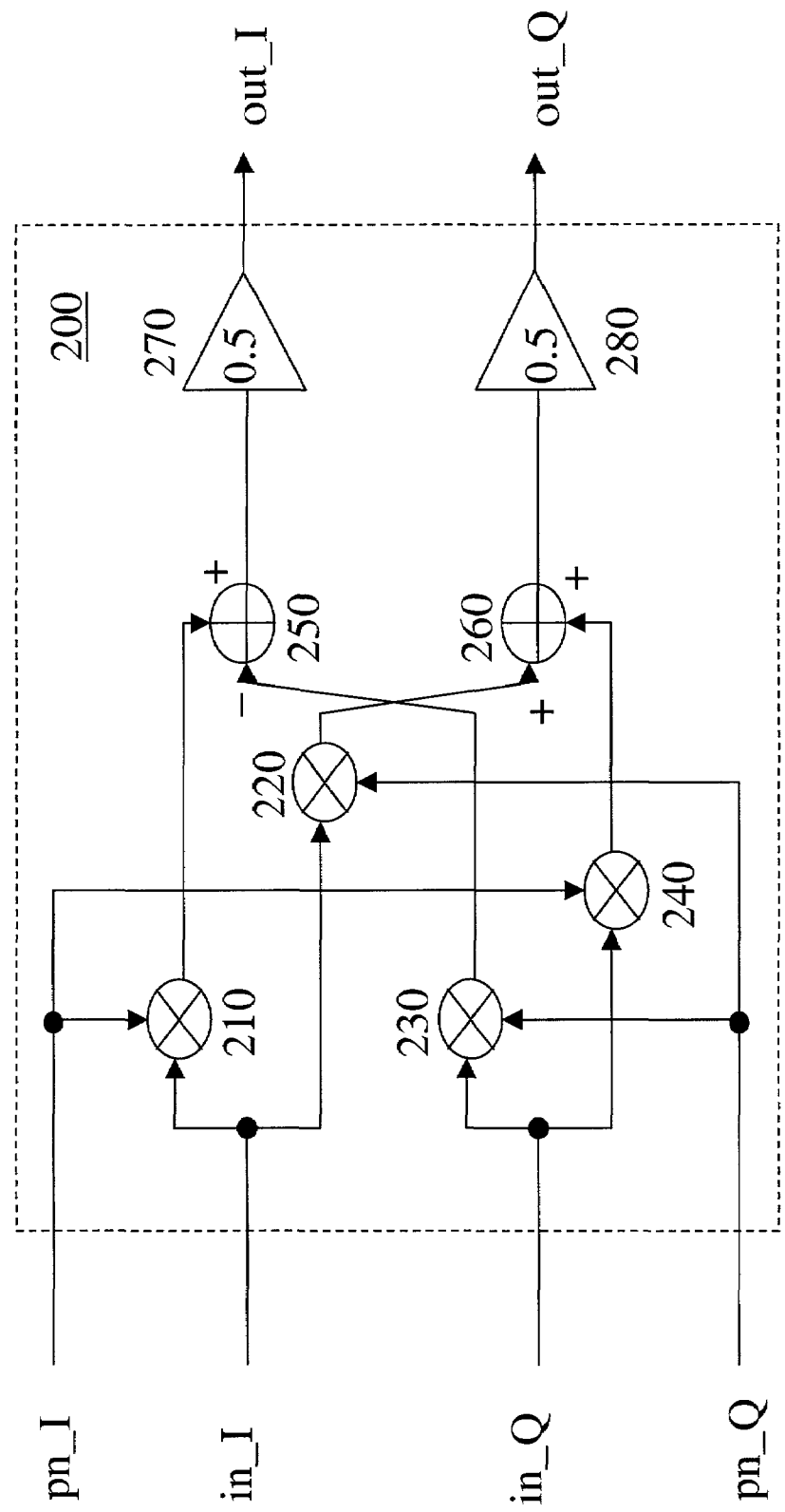
FIG. 8 is a circuit diagram of a basic QPSK spreading system.

In QPSK spreading, the mapping of data input to spreading system output may be defined by the following complex relation:

$$\text{out\_}I + j \times (\text{out\_}Q) = \frac{1}{2} \times [\text{in\_}I + j \times (\text{in\_}Q)] \times [pn\_I + j \times (pn\_Q)],$$

where in_I and in_Q are the two input data signals; pn_and pn_Q are the pseudonoise sequences for the I and Q channels, respectively; out_I and out_Q are the output signals for the I and Q channels, respectively; j is the square root of −1; and the input signals and pseudonoise sequence elements may have values of +1 or −1. FIG. 8 shows a circuit diagram for a basic QPSK spreading system 200 which implements the relation above, using four multipliers 210, 220, 230, and 240 as spreaders; two adders 250 and 260; and two scalers 270 and 280 each having a scaling factor of 0.5. TABLE 5 shows the output values for spreading system 200 that correspond to the given range of inputs.

Figure 9:
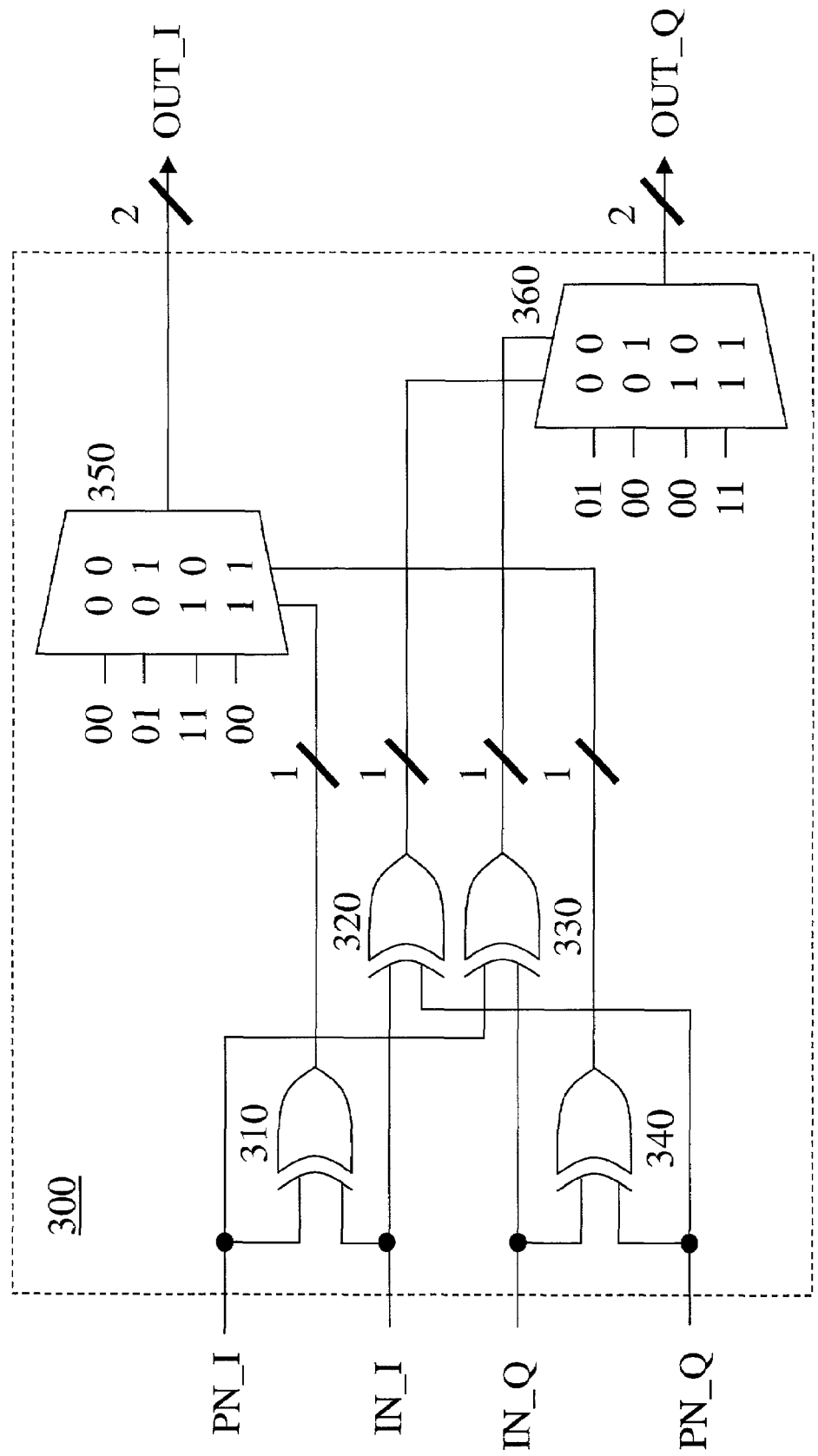
FIG. 9 is a digital implementation of the circuit of FIG. 8.
Figure 10:
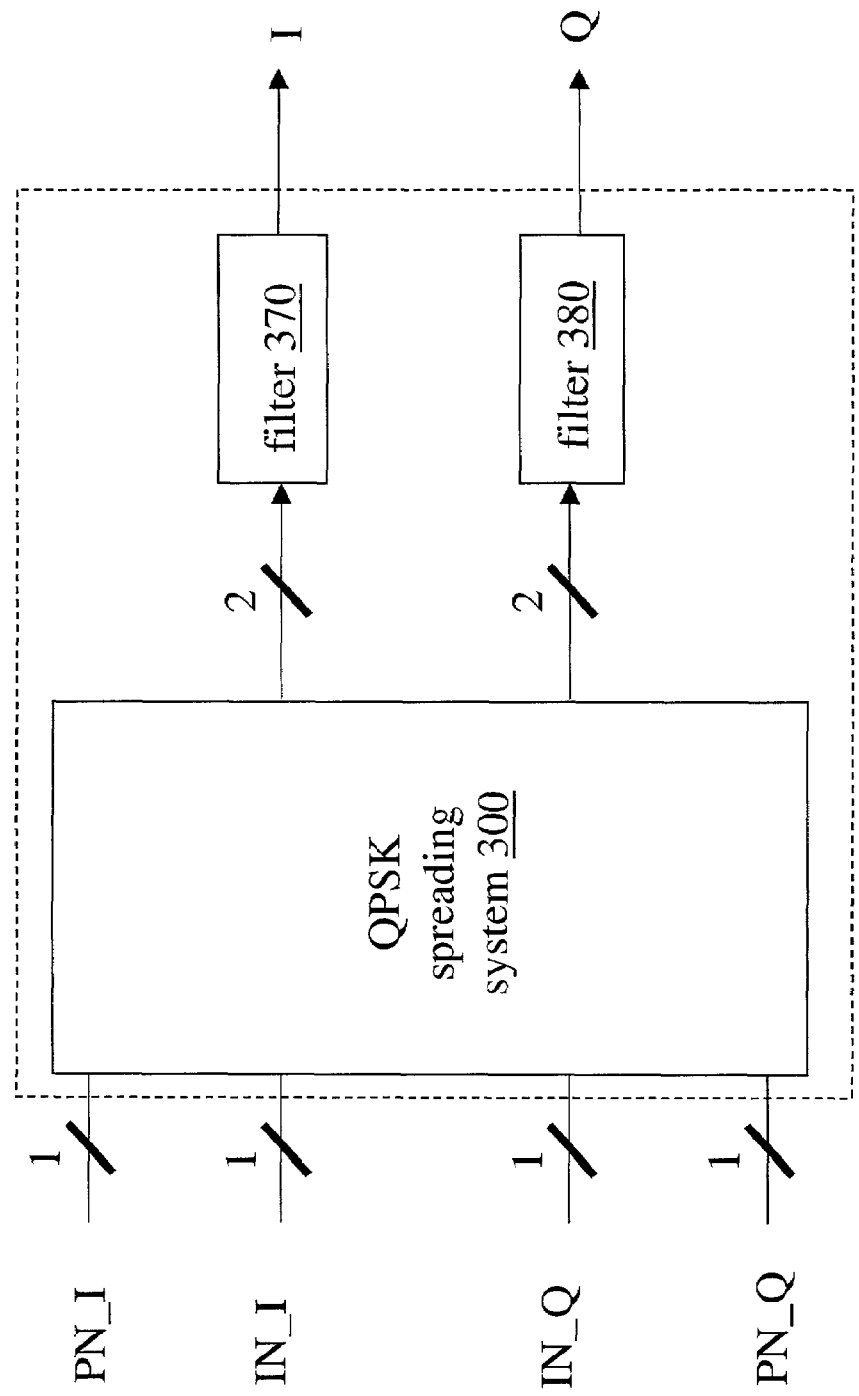
FIG. 10 is a circuit diagram of another QPSK spreading system.

FIG. 9 shows a digital implementation 300 of the QPSK spreading system of FIG. 8 using XOR gates 310, 320, 330, and 340 as spreaders and four-to-one two-bit multiplexers 350 and 360. Each of the multiplexers 350 and 360 has four hard-wired two-bit inputs with the values indicated and two one-bit select inputs each connected to the output of one of the XOR gates 310, 320, 330, and 340. FIG. 10 shows a circuit diagram for another QPSK spreading system that includes this implementation. For the input signals to system 300, the analog-to-digital mapping is given in TABLE 2. For the output signals of system 300, two digital bits are required in order to represent three possible analog output values (+1, −1, and 0). An analog-to-digital output mapping for system 300 is given in TABLE 6 (in this mapping, the two-bit digital number '10' is not used).

TABLE 5

| in_I | in_Q | pn_I | pn_Q | out_I | out_Q |
|------|------|------|------|-------|-------|
| −1 | −1 | −1 | −1 | 0 | +1 |
| −1 | −1 | −1 | +1 | +1 | 0 |
| −1 | −1 | +1 | −1 | −1 | 0 |
| −1 | −1 | +1 | +1 | 0 | −1 |
| −1 | +1 | −1 | −1 | +1 | 0 |
| −1 | +1 | −1 | +1 | 0 | −1 |
| −1 | +1 | +1 | −1 | 0 | +1 |
| −1 | +1 | +1 | +1 | −1 | 0 |
| +1 | −1 | −1 | −1 | −1 | 0 |
| +1 | −1 | −1 | +1 | 0 | +1 |
| +1 | −1 | +1 | −1 | 0 | −1 |
| +1 | −1 | +1 | +1 | +1 | 0 |

TABLE 5-continued

| in_I | in_Q | pn_I | pn_Q | out_I | out_Q |
|------|------|------|------|-------|-------|
| +1 | +1 | −1 | −1 | 0 | −1 |
| +1 | +1 | −1 | +1 | −1 | 0 |
| +1 | +1 | +1 | −1 | +1 | 0 |
| +1 | +1 | +1 | +1 | 0 | +1 |

TABLE 6

| Analog value | Digital representation |
|--------------|------------------------|
| −1 | 11 |
| 0 | 00 |
| +1 | 01 |

Note in FIGS. 8 and 9 that the I and Q input data streams are no longer processed in separate paths: the output on the I channel depends in part on the input on the Q channel, and the output on the Q channel depends in part on the input on the I channel. As described below, such commingling of the input data signals may cause complications when it is desired to incorporate features for enhanced performance into the architecture.

Some existing spread spectrum systems implement a pilot signal on the forward link (i.e. the path from the base station to the mobile station, also called the downlink) in order to provide the phase reference needed for coherent demodulation. Although adding a pilot signal to the channel increases the noise level, it has been determined that the added interference is more than offset by the gain in bit-error rate which is realized by using coherent demodulation. Moreover, an additional advantage may be gained in that the presence of a known pilot signal enables the use of channel estimation techniques.

While it is desirable to obtain the same advantages on the reverse link (i.e. the path from the mobile station to the base station, also called the uplink), implementing a pilot signal on the reverse link is more problematic. Because many different mobile stations may be transmitting on the same reverse link channel at once, simply adding a different pilot signal to each one of those transmissions would create unacceptable levels of interference.

Figure 11:
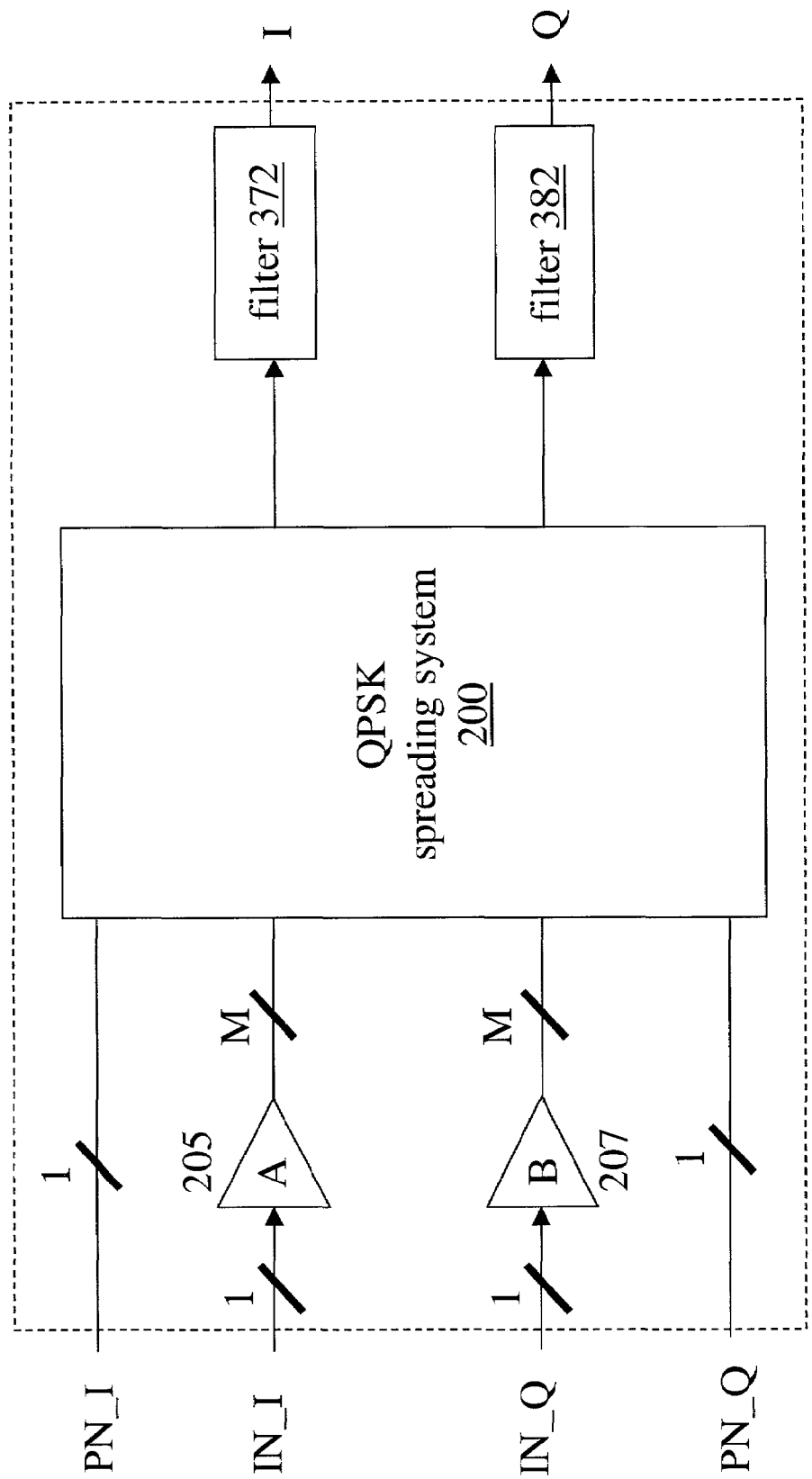
FIG. 11 is a circuit diagram of an enhanced QPSK spreading system.

In new spread spectrum systems, this problem is being overcome in part by using different pilot/data signal power ratios for different data transmission rates. One way to implement this feature is to introduce a gain element into either the pilot signal or the data signal. FIG. 11 shows a circuit in which separate gain elements for the pilot and data signals are used (where, for example, the pilot signal is transmitted as IN_I and the data signal is transmitted as IN_Q). Unfortunately, inserting such gain elements causes the complexity of the rest of the system to increase dramatically.

Figure 1:
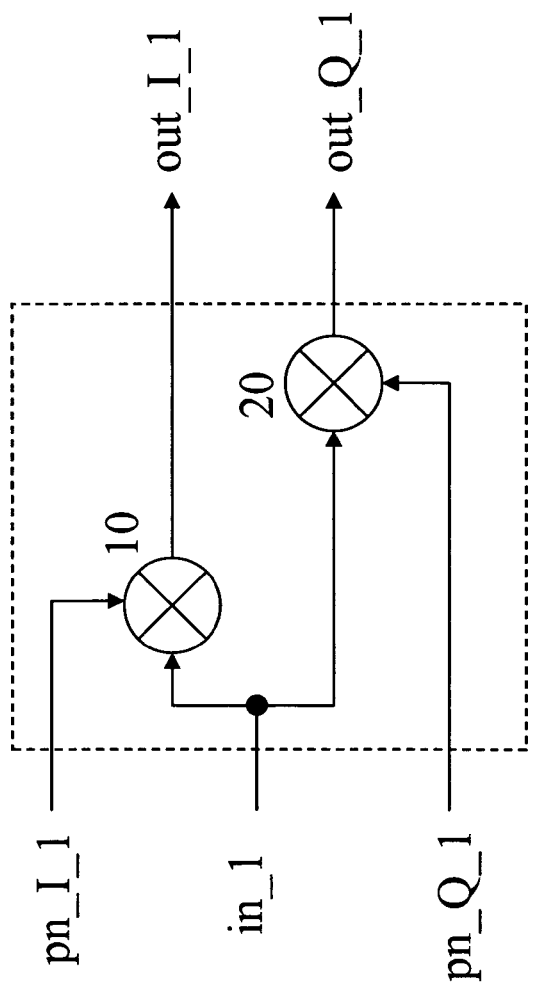
FIG. 1 is a circuit diagram of a BPSK spreader array.
Figure 2:
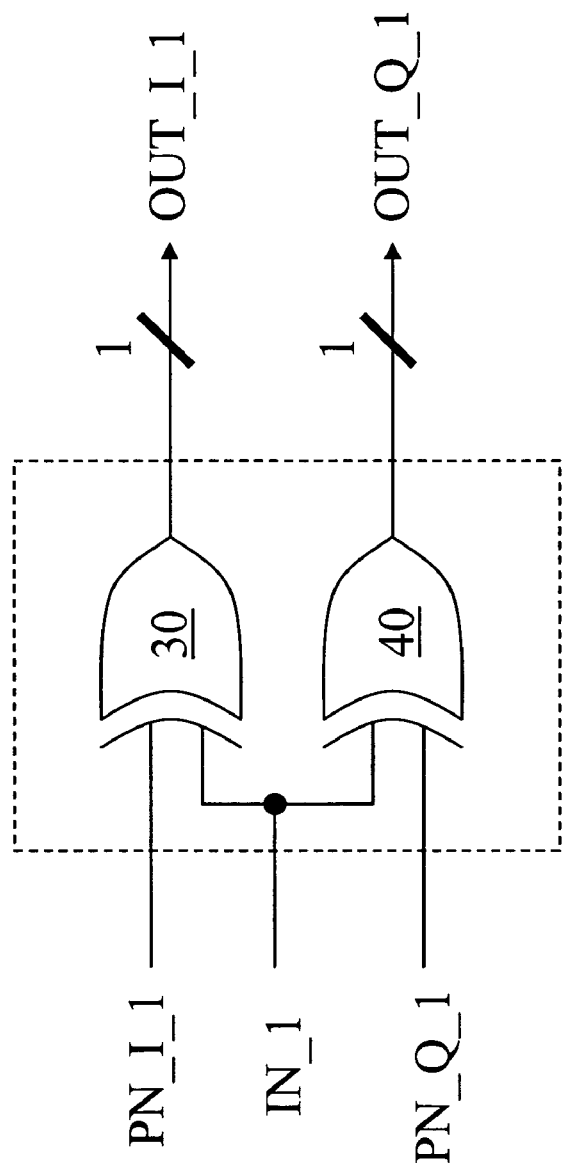
FIG. 2 is a digital implementation of the circuit of FIG. 1.
Figure 3:
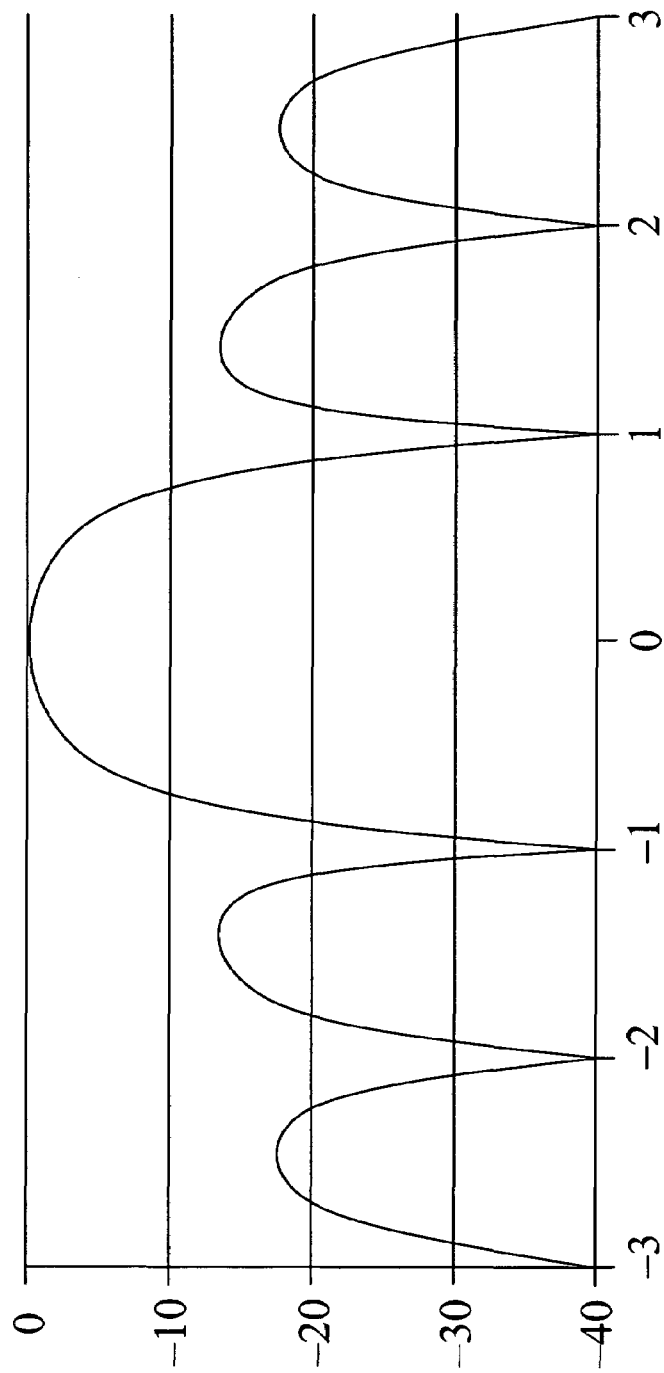
FIG. 3 is a graph of the spectrum of a signal at the output of the circuit of FIG. 1, plotted as frequency normalized to the chip rate vs. magnitude in dB.
Figure 4:
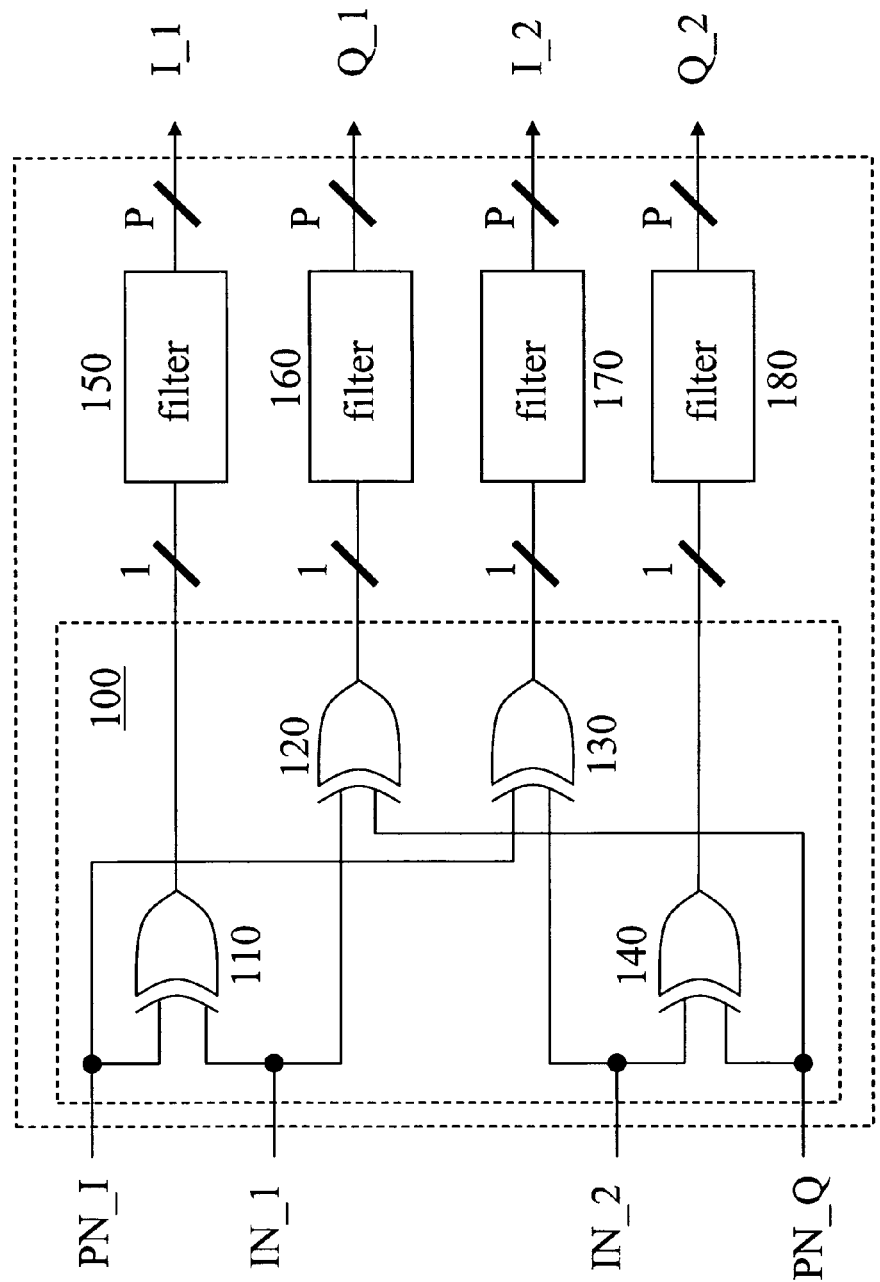
FIG. 4 is a circuit diagram of a BPSK spreading system.
Figure 5:
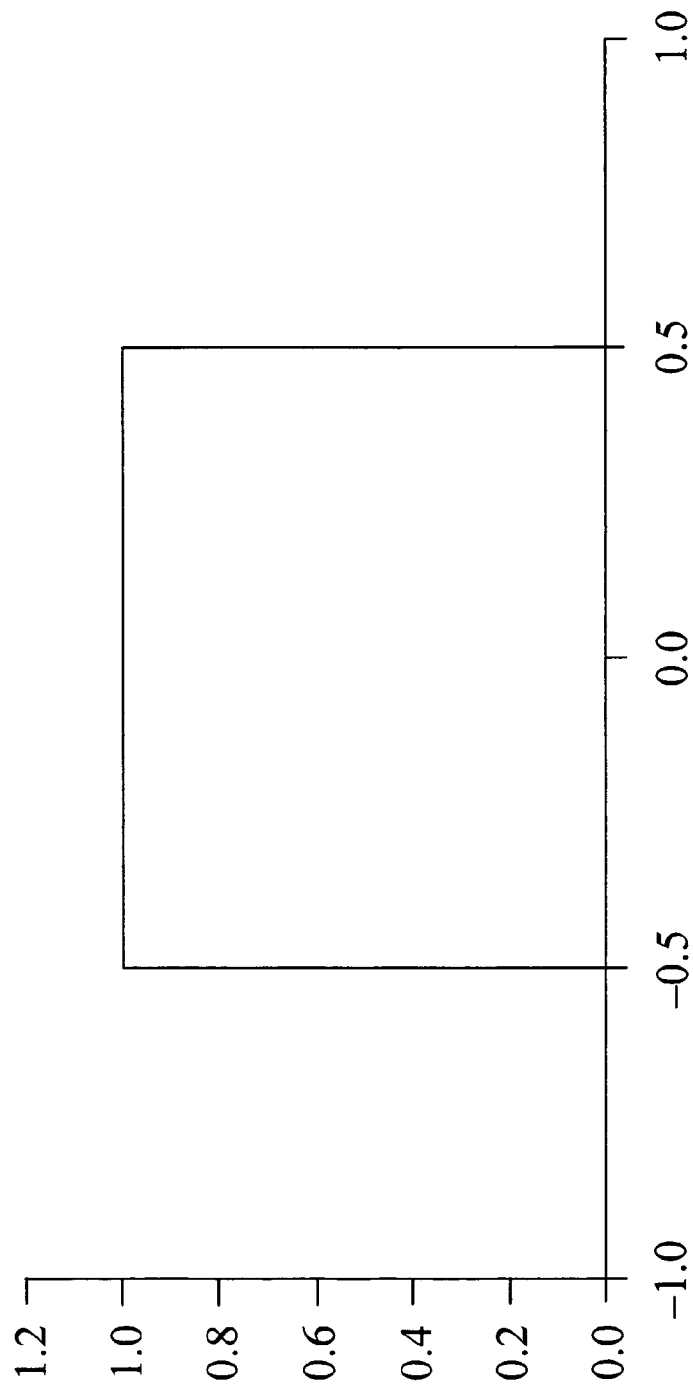
FIG. 5 is a graph of the spectrum of the frequency response of an ideal lowpass filter for limiting the bandwidth of a signal to the chip rate, plotted as frequency normalized to the chip rate vs. magnitude normalized to a peak value.
Figure 6:
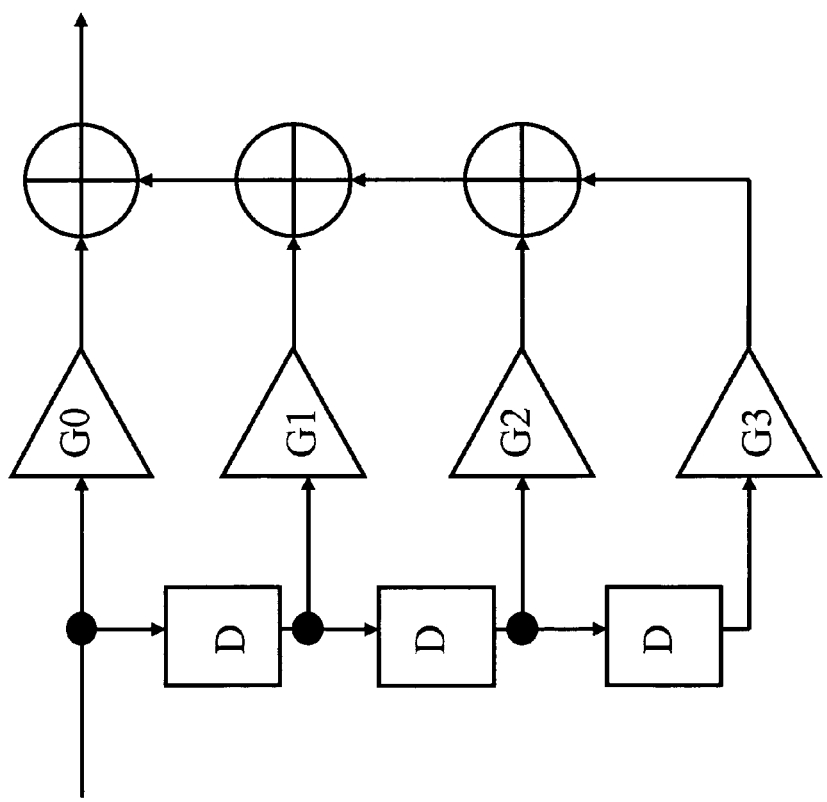
FIG. 6 is a block diagram of one example of a three-tap FIR filter.
Figure 7:
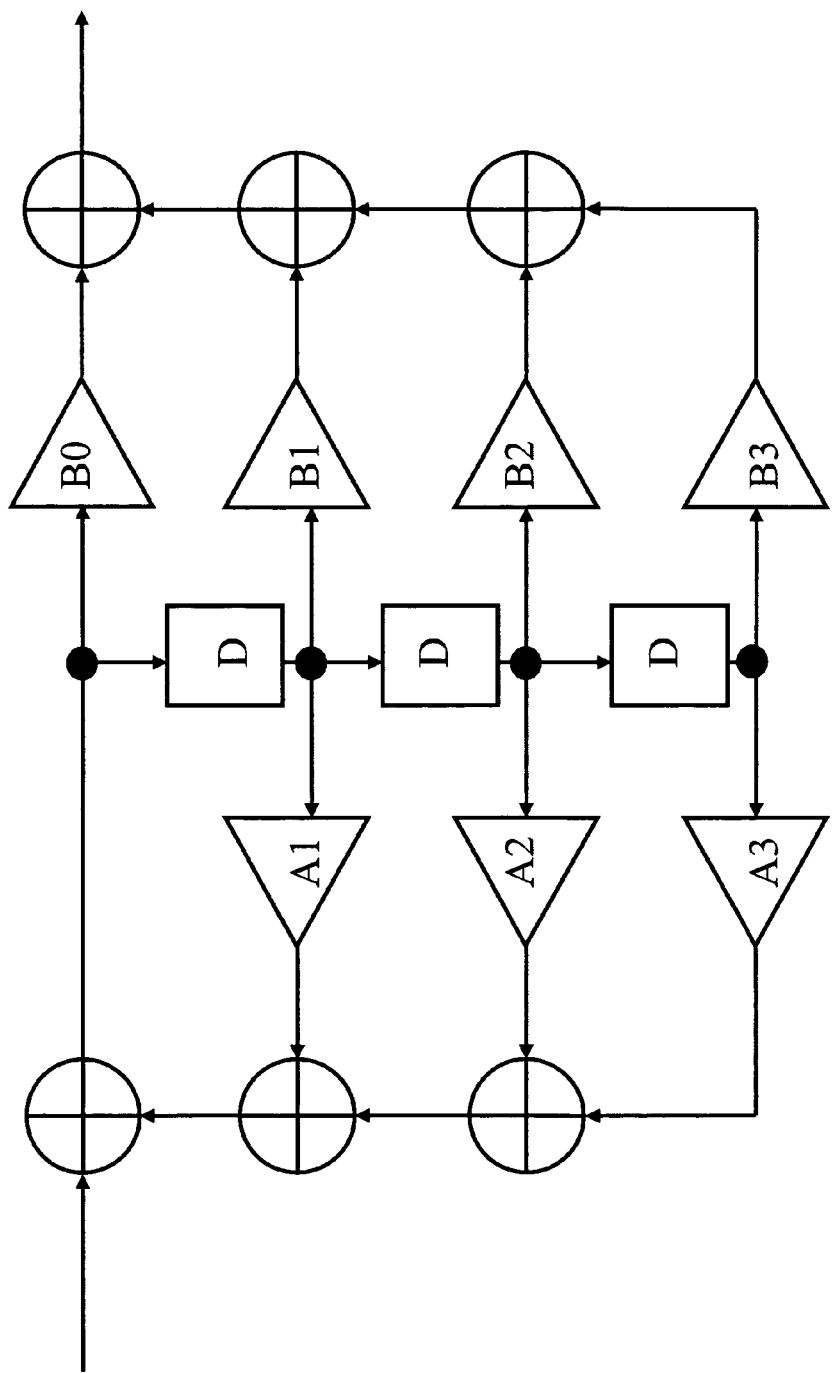
FIG. 7 is a block diagram of one example of a three-tap IIR filter.

In the BPSK implementation of FIG. 4, a mathematically equivalent result may be obtained whether gain control is performed on a signal IN_n or, alternatively, on a corresponding pair of signals I_n and Q_n. (Note that it may be necessary to implement the gain control differently for each of these two cases, and that the two results may therefore differ somewhat because of associated errors such as roundoff.) This equivalence is possible, in part, because each digital output signal in this BPSK implementation depends on only one input signal. Consequently, the designer may choose whichever approach will produce the least total complexity: for example, to perform gain control on the output signals so that the input signals to the pulse-shaping filters will remain only one bit wide.

In the QPSK spreader of FIG. 8, however, the input signals become commingled. Therefore, a similar rearrangement is not possible in conventional QPSK implementations, and in these systems gain control must be performed before the signals are inputted to the spreading system. Because the gain elements transform a one-bit-wide input into an output some M bits wide, the input to the spreading system is now an M-bit-wide stream instead of a single-bit wide stream, and the elements of the spreading system must therefore become more complex. This increase in circuit complexity is compounded at the pulse-shaping filters 372 and 382, as these devices typically perform many more operations per sample than the spreaders.

Figure 15:
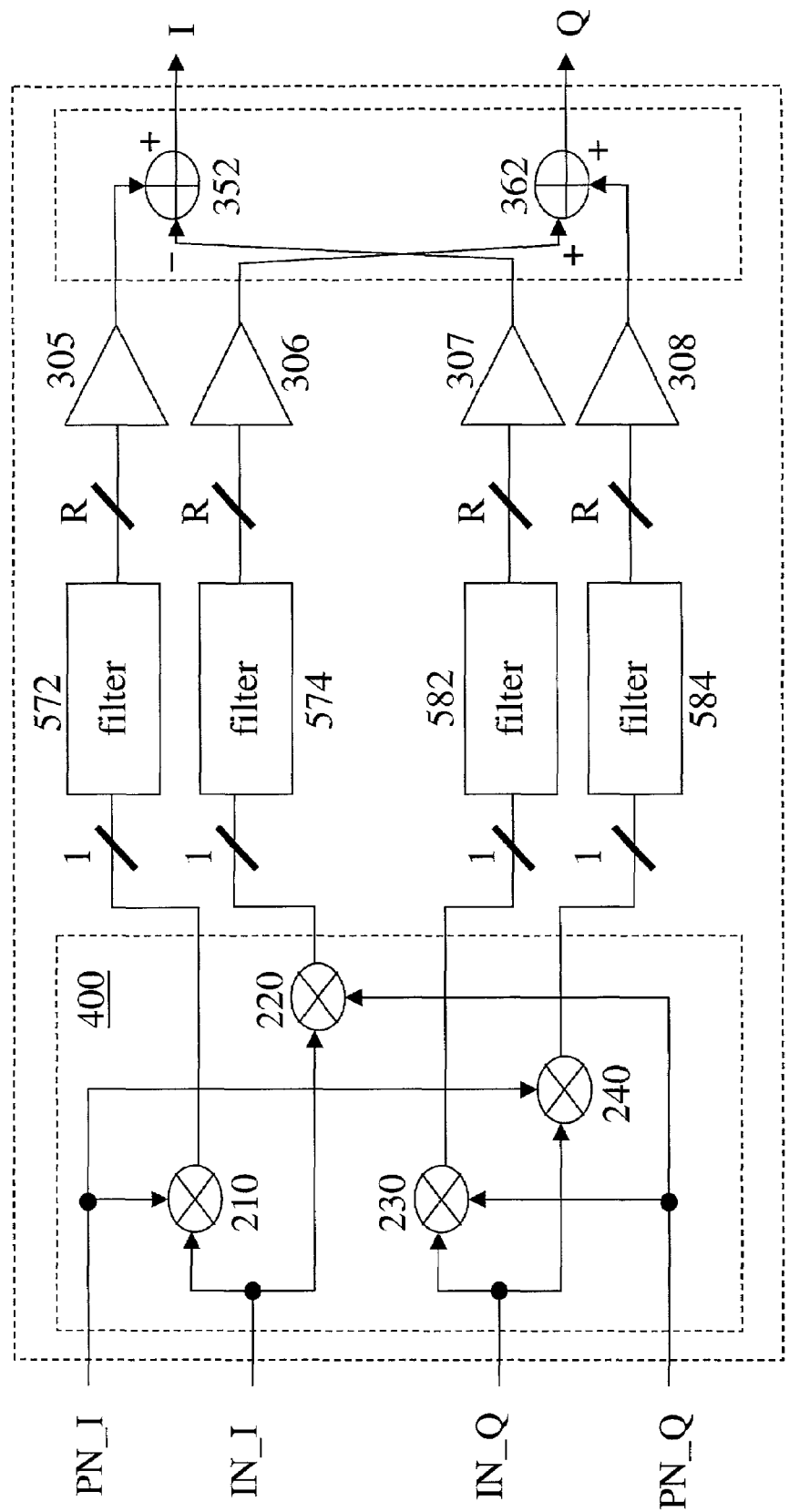
FIG. 15 is a circuit diagram showing a spreading system according to an embodiment of the invention.

As described above, conventional approaches to adding individual gain control to the inputs of a QPSK spreading system result in a significant increase in hardware complexity. A spreading system according to an embodiment of the invention as illustrated in FIG. 15 incorporates a novel rearrangement of circuit elements in performing an equivalent digital function with a significant reduction in hardware and power requirements. In order to show how the system illustrated in FIG. 15 can perform the same operation as the circuit in FIG. 11 with less complex hardware, we demonstrate its equivalence with a series of transformations.

First, we divide the QPSK spreading system of FIG. 8 into two sections 400 and 410, separating the spreading adders 250 and 260 from the spreading multipliers 210, 220, 230, and 240. (The scalers 270 and 280 in FIG. 8 may accompany the adders into section 410 or may be incorporated into a later stage. In many implementations, only the relative values of the output signals are of interest, and not their absolute values, and the scalers may therefore be omitted as in FIGS. 12, 14, and 15.) Applying this operation to the circuit of FIG. 11; moving gain elements 205 and 207 to follow the spreading multipliers; and adding gain elements 206 and 208 being functional equivalents of gain elements 205 and 207, respectively, we obtain the circuit of FIG. 12. Factors supporting the commutation of the multiplication and gain operations to obtain a theoretically identical result include equivalence of the gain operation to a multiplication operation, that multiplication is linear and time-invariant operation, and that the input paths remain separated at the outputs of the spreading multipliers.

Figure 12:
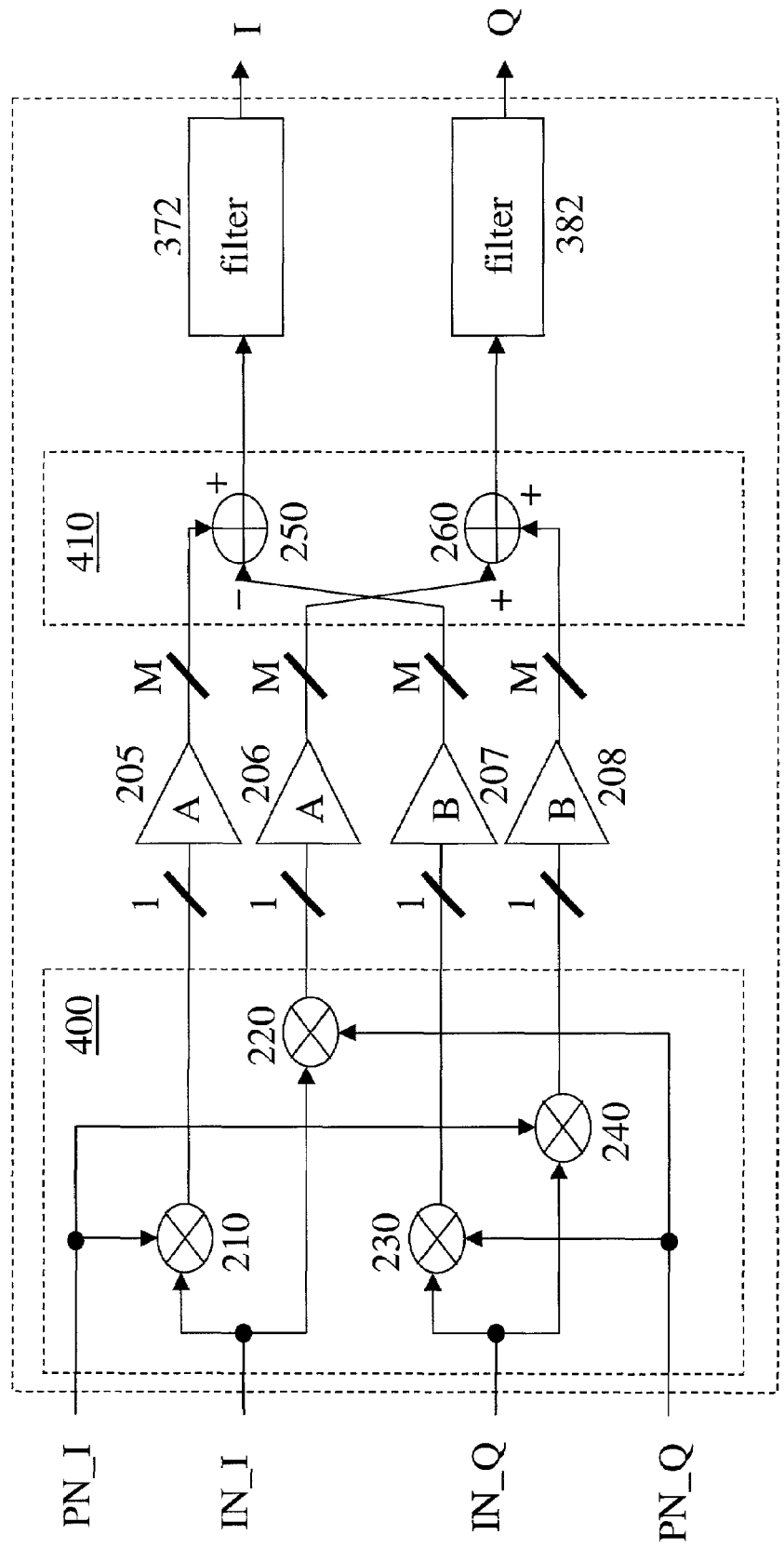
FIG. 12 is a circuit diagram showing a novel modification to the system of FIG. 11.
Figure 13:
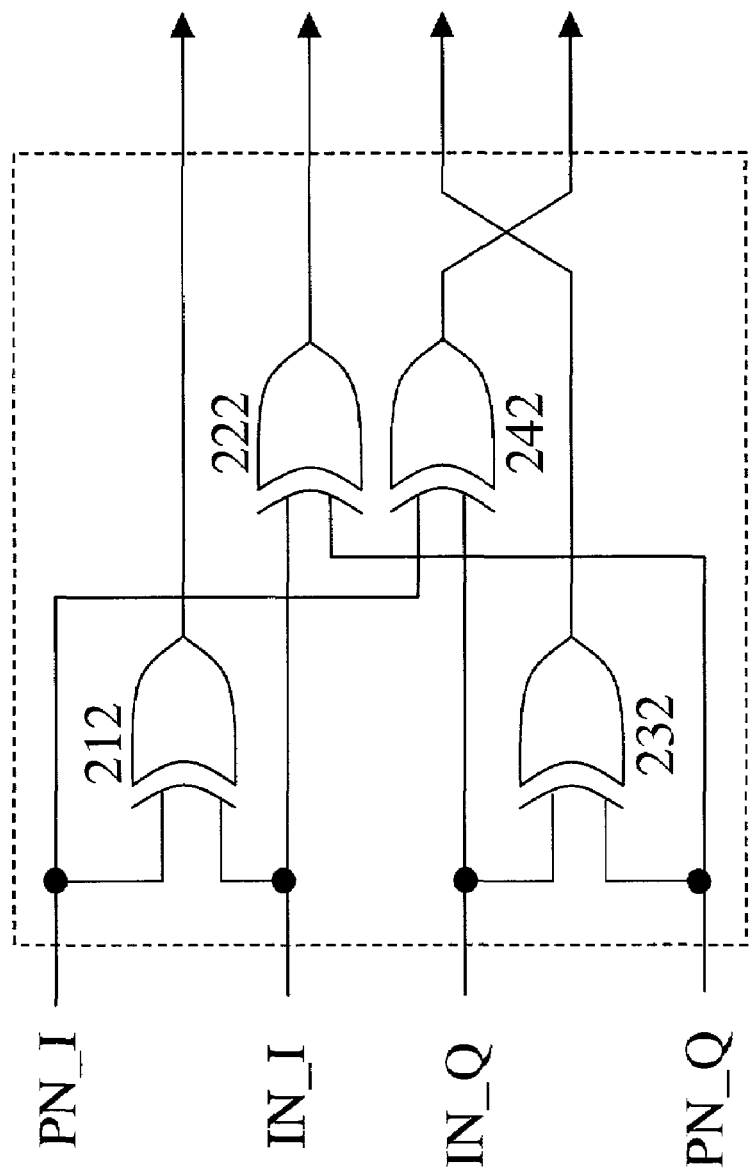
FIG. 13 is a digital implementation of the spreader array 400 shown in FIG. 12.

In the circuit of FIG. 12, the inputs to the multiplier spreaders are now only one bit wide. Therefore, we may implement each of these multipliers with only a single XOR gate (as illustrated in FIG. 13 with XOR gates 212, 222, 232, and 242) in place of the M-bit multiplier that would be required using a conventional arrangement. Possible advantages include improvements in both circuit area and speed.

Figure 14:
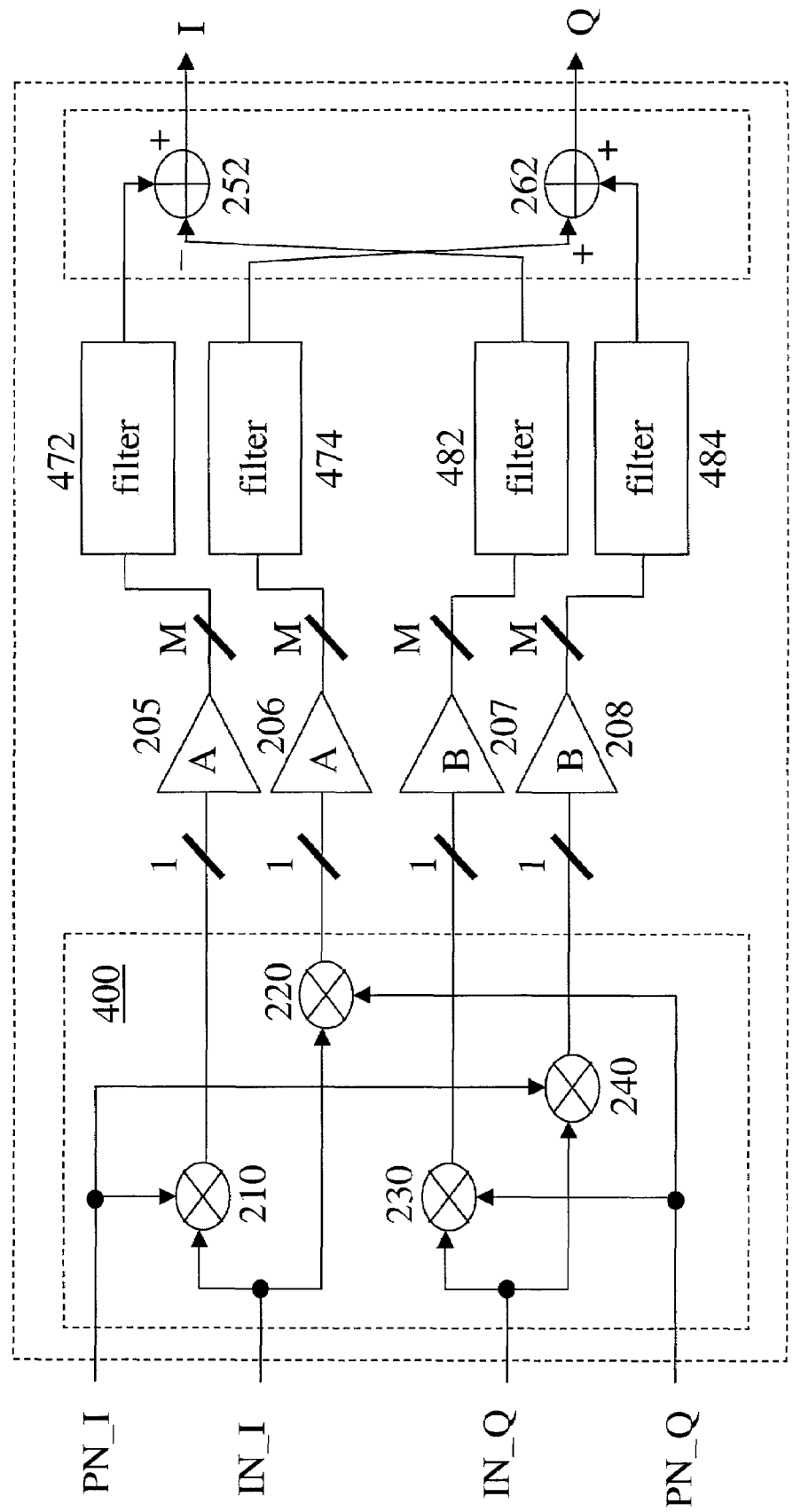
FIG. 14 is a circuit diagram showing a modification to the novel circuit of FIG. 12.

Because linear constant coefficient filters are also linear and time-invariant operators, we may perform the same type of rearrangement to the right side of FIG. 12, moving the pulse-shaping filters before the spreading adders to obtain the circuit of FIG. 14. Filters 472 and 482 may be equivalent to filters 372 and 382, respectively, or they may be simpler, depending on whether the widths of the inputs to filters 372 and 382 are equal to or greater than M. Filters 474 and 484 are functional equivalents of filters 472 and 482, respectively. Depending on the widths of the outputs of filters 372, 374, 382, and 384, adders 252 and 262 may be the same as adders 250 and 260, respectively, or they may have different input widths. At first, this rearrangement may not appear desirable, as it includes four M-bit-input pulse-shaping filters instead of only two. However, additional modification of this arrangement may be performed.

In a following step of this demonstration, we move the gain elements after the pulse-shaping filters as in FIG. 15. The inputs to the gain elements 305, 306, 307, and 308 are now multiple bits wide, causing a modest increase in complexity. In this example, however, the inputs to the filters 572, 574, 582, and 584 are only one bit wide. This feature enables a much greater decrease in overall complexity: while each gain element incorporates the equivalent of only one multiplication, each filter performs the equivalent of numerous multiplications.

By potentially reducing the filter input to a one-bit binary signal, application of the invention as demonstrated may also enable the use of further optimizations. For example, U.S. Utility patent application Ser. No. 10/003,913, entitled "DIGITAL FILTER WITH STATE STORAGE" and filed on Oct. 31, 2001, discloses a digital filter that may be implemented as a one-bit-wide-input pulse-shaping filter and is hereby incorporated by reference. Depending on the widths of their inputs, adders 352 and 362 may be the same as adders 252 and 262, respectively, or they may have different input widths.

Figure 16:
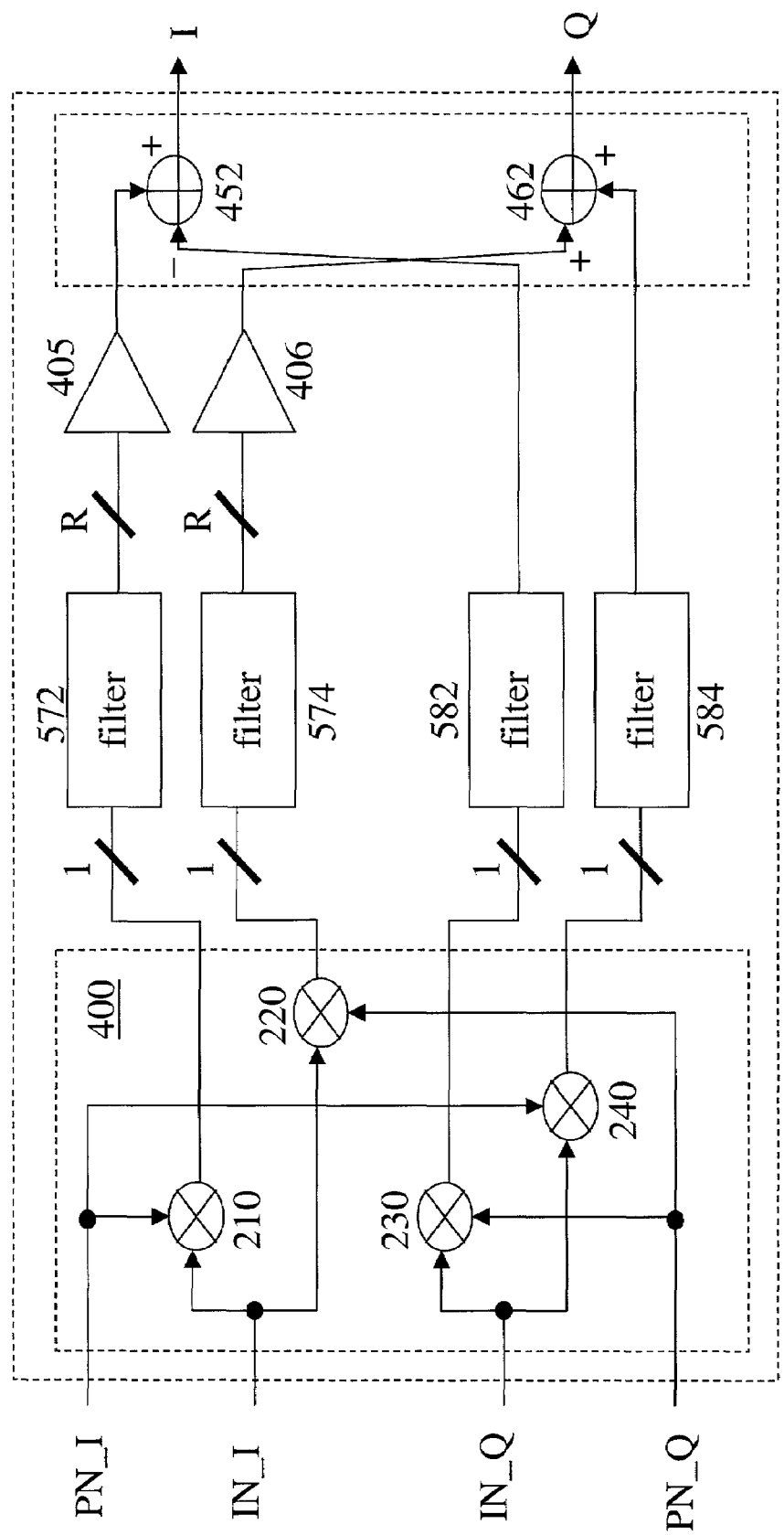
FIG. 16 is a circuit diagram showing a spreading system according to an embodiment of the invention.

In order to control a ratio between the levels of signals IN_I and IN_Q, it may only be necessary to control the level of one of the two signals. FIG. 16 shows a spreading system according to an embodiment of the invention wherein the gain of only one input signal path is controlled via gain elements 405 and 406, thus simplifying the architecture somewhat. If it is also desirable to control the overall gain of the output signal, such gain control may be added in an additional stage or may be incorporated into an existing later stage. Depending on the widths of their inputs, adders 452 and 462 may be the same as adders 352 and 362, respectively, or they may have different input widths.

Figure 17:
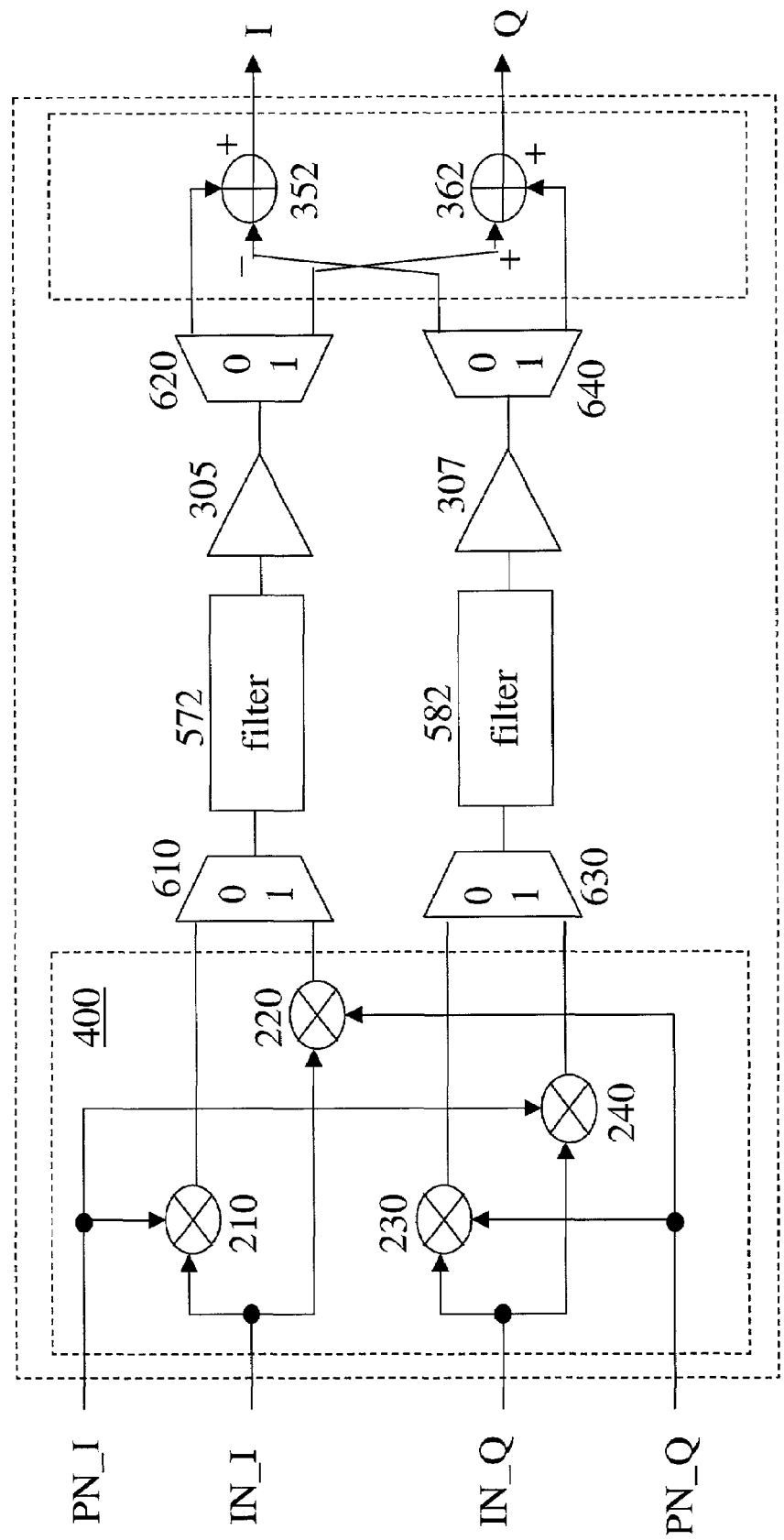
FIG. 17 is a circuit diagram showing a spreading system according to an embodiment of the invention.

FIG. 17 shows a spreading system according to an embodiment of the invention wherein only two filters are used. Multiplexers 610–640 may be controlled, for example, by a clock signal having a rising edge at each transition on signals IN_1, IN_Q and a 50% duty cycle. By alternating use of the filter signal path, hardware requirements may be reduced. Depending on the particular implementation, latches (not shown) may be provided between the multiplexers and adders 352, 362 or subsequent to the adders. As shown in FIG. 16, it may also be desirable to omit one of gain elements 305, 307 (or both, if such control is not required).

The foregoing description of the preferred embodiments is provided to enable any person skilled in the art to make or use the present invention. Various modifications to these embodiments are possible, and the generic principles presented herein may be applied to other embodiments as well. For example, an embodiment of the invention may be implemented in part or in whole as a hard-wired circuit or as a circuit configuration fabricated into an application-specific integrated circuit.

An embodiment of the invention may also be implemented in part or in whole as a firmware program loaded into non-volatile storage or a software program loaded from or into a data storage medium as machine-readable code, such code being instructions executable by an array of logic elements such as a microprocessor or other digital signal processing unit. Thus, the present invention is not intended to be limited to the embodiments shown above but rather is to be accorded the widest scope consistent with the principles and novel features disclosed in any fashion herein.

We claim:

1. A spreading system comprising:
   a first spreader configured and arranged to produce a first spread signal based on a first data signal and a first pseudonoise sequence, wherein the width of the first spread signal is one bit;
   a second spreader configured and arranged to produce a second spread signal based on a second data signal and the first pseudonoise sequence, wherein the width of the second spread signal is one bit;
   a first filter configured and arranged to produce a first filtered signal based on the first spread signal;
   a second filter configured and arranged to produce a second filtered signal based on the second spread signal;
   a first gain element configured and arranged to produce a first controlled signal based on the first filtered signal;
   a second gain element configured and arranged to produce a second controlled signal based on the second filtered signal; and
   an adder configured and arranged to produce a digital sum signal based on the first controlled signal and the second controlled signal.

2. The spreading system according to claim 1, wherein the widths of the filtered signals are greater than one bit.

3. The spreading system according to claim 1, wherein the first spreader includes an exclusive-or gate.

4. The spreading system according to claim 1, wherein the first gain element includes a multiplier.

5. The spreading system according to claim 1, wherein the first filter comprises a lowpass filter having a cutoff frequency substantially equal to one-half of a bit rate of the first spread signal.

6. The spreading system according to claim 1, further comprising:
   a third spreader configured and arranged to produce a third spread signal based on the first data signal and a second pseudonoise sequence, wherein the width of the third spread signal is one bit;
   a fourth spreader configured and arranged to produce a fourth spread signal based on the second data signal and the second pseudonoise sequence, wherein the width of the fourth spread signal is one bit;
   a third filter configured and arranged to produce a third filtered signal based on the third spread signal;
   a fourth filter configured and arranged to produce a fourth filtered signal based on the fourth spread signal;
   a third gain element configured and arranged to produce a third controlled signal based on the third filtered signal;
   a fourth gain element configured and arranged to produce a fourth controlled signal based on the fourth filtered signal; and
   a second adder configured and arranged to produce a digital sum signal based on the third and fourth controlled signals.

7. The spreading system according to claim 6, wherein the widths of the third and fourth filtered signals are greater than one bit.

8. A method of digital signal processing, the method comprising:
   spreading a first data signal with a first pseudonoise sequence to obtain a first spread signal having a width of one bit;

spreading a second data signal with the first pseudonoise sequence to obtain a second spread signal having a width of one bit;

filtering the first spread signal to obtain a first filtered signal;

filtering the second spread signal to obtain a second filtered signal;

multiplying the first filtered signal by a first gain factor to obtain a first controlled signal;

multiplying the second filtered signal by a second gain factor to obtain a second controlled signal; and adding the filtered the first controlled signal and the second controlled signal to obtain a digital sum signal.

9. The method of digital signal processing according to claim 8, wherein the widths of the filtered signals are greater than one bit.

10. The method of digital signal processing according to claim 8, wherein the spreading the first data signal comprises performing an exclusive-OR operation having the first data signal and the first pseudonoise sequence as inputs and having the first spread signal as an output.

11. The method of digital signal processing according to claim 8, the method further comprising:

spreading the first data signal with a second pseudonoise sequence to obtain a third spread signal having a width of one bit;

spreading the second data signal with the second pseudonoise sequence to obtain a fourth spread signal having a width of one bit;

filtering the third spread signal to obtain a third filtered signal;

filtering the fourth spread signal to obtain a fourth filtered signal;

multiplying the third filtered signal by a third gain factor to obtain a third controlled signal;

multiplying the fourth filtered signal by a fourth gain factor to obtain a fourth controlled signal; and adding third controlled signal and the fourth controlled signal to obtain a second digital sum signal.

* * * * *